No. 798,243. PATENTED AUG. 29, 1905.
P. H. WATTS.
CENTRIFUGAL SEPARATOR.
APPLICATION FILED MAR. 2, 1905.

2 SHEETS—SHEET 1.

Witnesses
George G. Schoenlank
Aloysius Donnelly

Inventor
Pierce Henry Watts
by H. van Deventer
Attorney

No. 798,243. PATENTED AUG. 29, 1905.
P. H. WATTS.
CENTRIFUGAL SEPARATOR.
APPLICATION FILED MAR. 2, 1905.

2 SHEETS—SHEET 2.

*FIG. 5*     *FIG. 6*

UNITED STATES PATENT OFFICE.

PIERCE HENRY WATTS, OF DURSLEY, ENGLAND.

CENTRIFUGAL SEPARATOR.

No. 798,243. Specification of Letters Patent. Patented Aug. 29, 1905.

Application filed March 2, 1905. Serial No. 248,053.

*To all whom it may concern:*

Be it known that I, PIERCE HENRY WATTS, a subject of the King of Great Britain, residing at Long street, Dursley, in the county of Gloucester, England, have invented certain new and useful Improvements in Cream-Separators, of which the following is a specification.

This invention particularly relates to the improved construction of conical disks which are superposed one upon another in centrifugal liquid-separator bowls for separating liquids of different densities, such as cream from milk.

I am aware of various centrifugal liquid-separators in which more or less plain conical disks are used, as well as those with radial holes and those with spiral passages for effecting the separation; but according to my invention I employ conical disks of a very special shape, as hereinafter set forth; but the general construction of the outer shell of the bowl and the means for feeding in the liquid, such as new milk, may be of various designs known to the trade.

To facilitate conception of my invention, I have appended hereunto two sheets of drawings, upon which—

Figure 2:
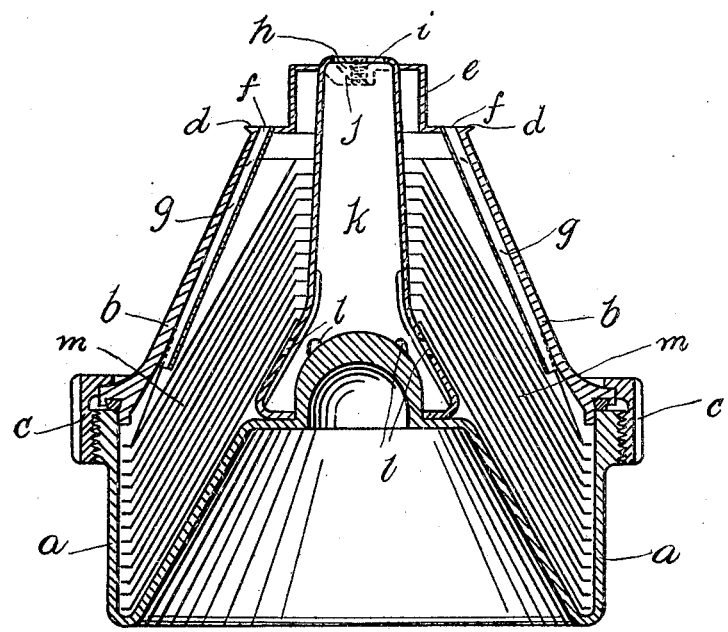
Figure 1:
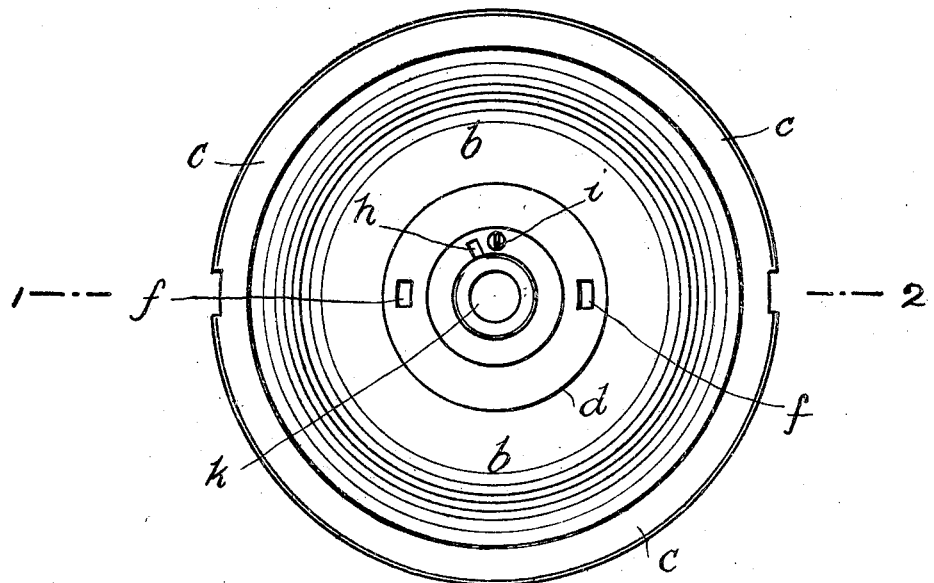
Figure 4:
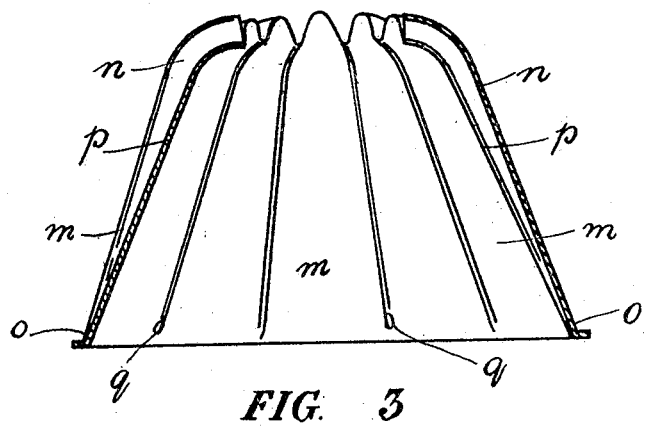
Figure 3:
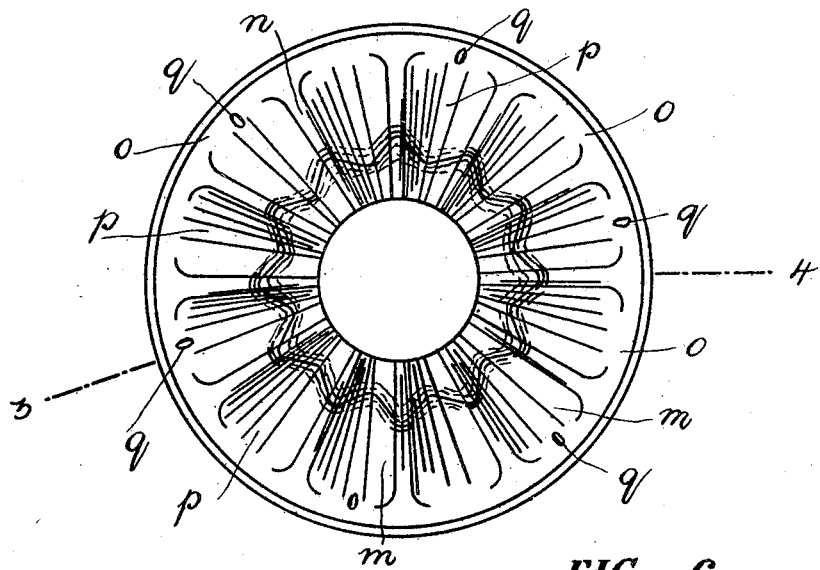
Figure 3:
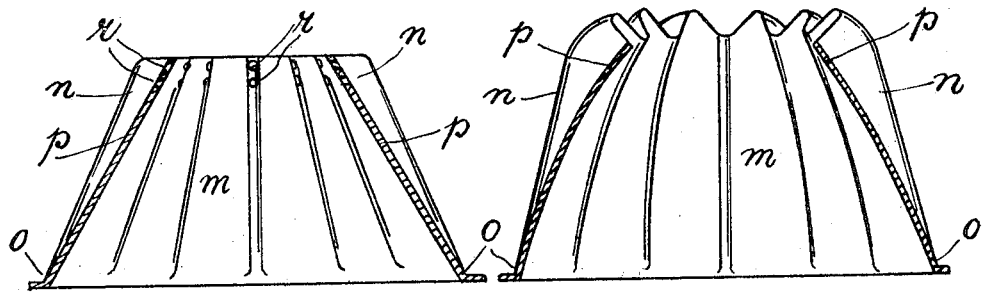

Figure 1 is an external plan view of the bowl of a cream-separator. Fig. 2 is a cross-sectional elevation on the line 1 2 of Fig. 1, showing the internal arrangement of the parts. Fig. 3 is a plan of one form of my new corrugated cones which are the subject of my present invention. Fig. 4 is a cross-sectional elevation of the cone shown by Fig. 3, taken on the line 3 4. Figs. 5 and 6 show examples of some of the variations that may be adopted in my new corrugated cones.

In making a liquid-separator for the purpose of separating, say, cream from milk I may use a bowl or drum of the form illustrated in Figs. 1 and 2 of the accompanying drawings; but other formations may also be used. In the one shown $a$ is the bottom portion or base of the bowl, and $b$ is the upper portion, and the two parts $a$ and $b$ may be united by a junction screw-ring, such as $c$; but it is quite immaterial how these connections are made. The upper portion $b$ of the bowl is connected at $d$ to the cap portion $e$. An outlet or outlets $f$ in $d$ communicate with a tube or tubes $g$, which are provided for the discharge of the skimmed milk in the usual way. The cream passes upward inside the cap $e$ and issues at the outlet $h$, which is regulated as to size by a grub-screw $i$, which is capable of contracting the inclined passage $j$. A similar grub-screw may be applied also to the outlet passage or passages for the skimmed milk. The new milk is fed through the usual feeder $k$, which has a number of holes or outlets, such as $l$, and thence into the cones. The above explanation applies to well-known apparatus for the separation of cream from milk.

The particular portion of liquid-separators which form the subject of my present invention is the cones $m$, which are corrugated, as more clearly illustrated by Figs. 3, 4, 5, and 6 of the drawings. These corrugated cones are formed with ribs or corrugations $n$, which commence at or near the base of the cones $o$, where they are only just perceptible; but they become more pronounced as they ascend, and though shown vertical on the drawings they may deviate to the right or left from the vertical line or they may take a spiral course. By this means two separate inclines or surfaces are formed in each cone, the lesser ones $p$ being for the passage of the lighter liquid, such as cream, and the steeper ones (represented by $n$) for the skimmed milk or heavier portion of the liquid. The cream travels along the grooves or inward corrugations $p$ until it arrives at the top of the same. Then issuing from these it accumulates in the form of a "wall" around the feeder-tube $k$, rising upward until it reaches the inside of the cap $e$ and discharges through the outlet $h$. The skimmed milk passes from the lower ends of the steeper corrugations $n$ and thence up the inner faces of the bottom portion $a$ and top portion $b$ of the bowl to the outlets $f$. I find that the arrangement of two inclines— namely, the one $p$ for the cream and the one $n$ for the skimmed milk—is an advantage to the separating properties of the apparatus from which I am able to obtain improved results. The bowls or drum may be revolved on a spindle or inverted and suspended, both modes being well known to the trade, and various well-known modes of feeding in and distributing the liquid or milk may be used. The cones are separated from each other by means of distance-pieces or projections, such as $q$. In some cases the usual holes $r$ may be used in the cones, as shown at Fig. 5. The cones shown in section at Fig. 2 are straight ones and are not curved at the upper part, as shown in the separate views by Figs. 3, 4, 5, and 6.

What I claim, then, is—

1. The improvements in centrifugal liquid-separators, consisting of a bowl, and a plurality of internal cones arranged in the form of a pile, and each of which is corrugated with ribs and with valleys which increase in depth as they ascend to the upper part of the cone, when the ribs and valleys are very pronounced, the ribs and valleys forming two different inclines, in combination with means for filling liquid into said separator, and means for discharging the liquid therefrom.

2. A cone for centrifugal liquid-separators, consisting of a plate which is corrugated with ribs and valleys which increase in depth toward the upper part of the cone.

3. A cone for centrifugal liquid-separators, consisting of a body provided with external ribs which are inclined upwardly and inwardly and at an angle which gradually increases with respect to the body of the cone.

In testimony whereof I have signed my name to this specification in the presence of two subscribing witnesses.

PIERCE HENRY WATTS.

Witnesses:
HAROLD J. C. FORRESTER,
STANLEY BANNER.